United States Patent [19]

Wallerstein

[11] Patent Number: 5,585,787
[45] Date of Patent: Dec. 17, 1996

[54] PROGRAMMABLE CREDIT CARD

[76] Inventor: Robert S. Wallerstein, 9782 Tottenham Ct., Beverly Hills, Calif. 90210

[21] Appl. No.: 236,169

[22] Filed: May 2, 1994

Related U.S. Application Data

[63] Continuation-in-part of Ser. No. 803,972, Dec. 9, 1991, abandoned.

[51] Int. Cl.⁶ .............................. G07D 7/00; G06K 5/00
[52] U.S. Cl. ...................................... 340/825.34; 235/380
[58] Field of Search ........................ 340/825.34, 825.44, 340/286.06, 311.1; 235/380, 382, 382.5, 492

[56] References Cited

U.S. PATENT DOCUMENTS

| | | | |
|---|---|---|---|
| 4,253,017 | 2/1981 | Whitehead | 235/449 |
| 4,614,861 | 9/1986 | Pavlon et al. | 235/380 |
| 4,791,283 | 12/1988 | Burkhardt | 235/438 |
| 4,868,376 | 9/1989 | Lessin et al. | 235/492 |
| 4,918,631 | 4/1990 | Hara et al. | 364/708 |
| 4,926,480 | 5/1990 | Chaum | 380/23 |
| 4,928,001 | 5/1990 | Masada | 235/380 |
| 4,959,788 | 9/1990 | Nagata et al. | 364/408 |
| 4,960,982 | 10/1990 | Takahira | 235/382 |
| 5,168,520 | 12/1992 | Weiss | 380/23 |
| 5,192,947 | 3/1993 | Neustein | 340/825.44 |

FOREIGN PATENT DOCUMENTS

| | | | |
|---|---|---|---|
| 59-151259 | 8/1984 | Japan | 340/825.34 |
| 2189741 | 11/1987 | United Kingdom | 340/825.34 |

OTHER PUBLICATIONS

The Very Smart Card: A Plastic Pocke Bank, H. Shogase IEEE Spectrum, Oct. 1988, pp. 35–39.

*Primary Examiner*—Michael Horabik
*Assistant Examiner*—Edward Merz
*Attorney, Agent, or Firm*—Larson and Taylor

[57] ABSTRACT

A programmable credit card enables accessing of a selected one of a plurality of different credit accounts with the same or different credit card companies through communication with a clearing house for the credit accounts while providing important anti-fraud features. The credit card provides means for storing a basic account number and includes a keyboard for entering terminal digits which together with the basic account number define a completed account number and which identify a selected one of the plurality of accounts to be accessed, and for entering identification information for the card. The terminal digits are preserved along with the basic account number to provide the completed account number, together with the identification information, in a form which is readable by a reader device but is not discernible by the human eye, e.g., by emulating a magnetic strip. In an alternative embodiment, an optical reader can be used, upon reading of the completed account number and the identification information by the (e.g., magnetic) reader device during a credit transaction the completed account number and the identification information are directly transmitted to the clearing house for verification and subsequent debiting of the account corresponding to the selected terminal digits.

13 Claims, 2 Drawing Sheets

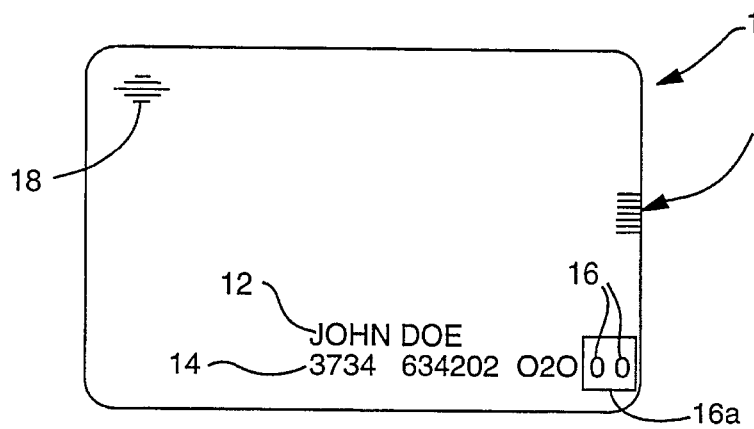
FIG. 1
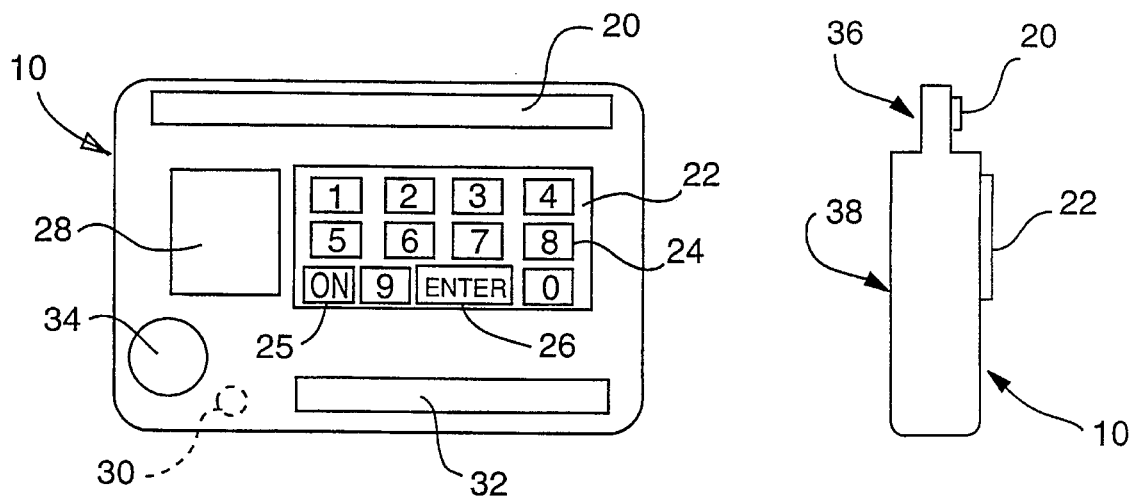
FIG. 2
FIG. 3
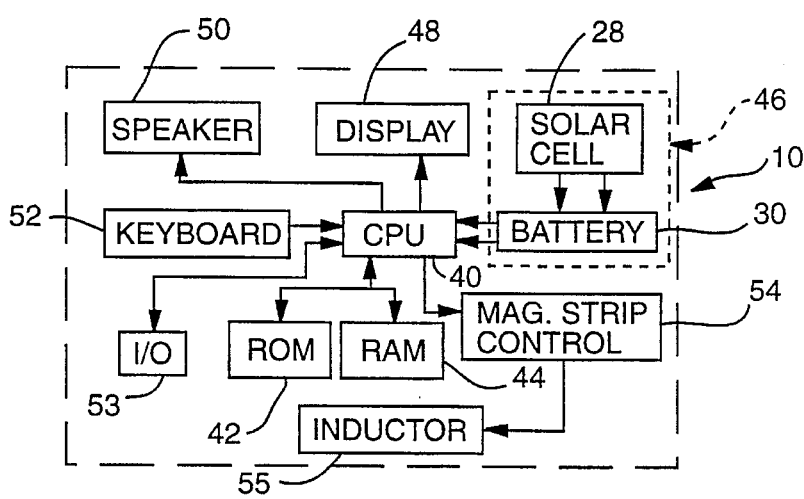
FIG. 4

PROGRAMMABLE CREDIT CARD

This application is a continuation-in-part of application Ser. No. 07/803,972 filed Dec. 9, 1991, now abandoned.

FIELD OF THE INVENTION

This invention relates generally to commercial credit cards and, more specifically, to a programmable integrated circuit credit card.

BACKGROUND OF THE INVENTION

At present, magnetic cards such as commercial credit cards are widely used for payments, cash advances, or other financial transactions through a communication system located at a retail store or a bank facility. Data for identifying the customer, such as an account number or other identifying data is magnetically stored on the card.

When a transaction is to be performed at a retail store, a customer hands his or her card to an employee of the retail store. The employee then either manually checks the account number against a list of bad account numbers which is published by the credit card company or scans the magnetic information into a communication device. In the first case, the employee has the responsibility for approving the credit card. This can lead to serious problems when a stolen credit card is presented for payment, since the lists are usually not up to date and are also hard to read. In the second case, the magnetic account and billing information is sent to the financial institution where it either accepted or declined. Since there is no method to check the authenticity of the purchaser, the financial institution must assume that the credit card user is the customer identified upon the card, unless they have been notified that the card is stolen or lost. This assumption leads to problems when a stolen credit card, which has not been reported, is utilized for the purchase of goods.

When a credit card is utilized in a bank in order to receive a cash advance, the transaction is handled by either a teller or an automated teller machine (ATM). In the case of a teller, the process described for a retail store is repeated. In the case of an ATM, the card is placed inside of the ATM and the credit card owner enters a person identification number (PIN) which is transmitted to the credit card company along with the transaction information. When the PIN is received by the credit company, the PIN is verified and, if correct, a determination is made to either allow or deny credit. When the PIN number is found to be incorrect, most credit companies send, to the credit card user, a request to reenter the PIN number. Thus, the user of a stolen credit card will know that the PIN number that was entered was incorrect.

In an attempt to provide greater security for credit cards, integrated circuit (IC) chips have been embedded into the credit cards. An interface is arranged on the surface or edge of the IC card to allow external equipment to access the information stored in the card. Therefore, when the IC card is inserted into a terminal device installed at, for example, a bank or retail store, the IC chip in the card is electrically connected to the terminal through the interface. The IC chip is energized from the terminal through the interface, and an identification number is entered at a keyboard in the terminal. The identification number pre-stored in the IC chip is read out and compared with the entered identification number in the terminal so as to determine whether or not the two identification numbers match, and whether the authorized user of the card is presenting the card.

However, in a conventional IC card, the IC chip is simply embedded in the card body, so that the terminal device must be used to identify the card user. The cost of such terminal devices is relatively high and imposes a financial strain on retail stores with relatively little capital. In addition to this disadvantage, the card holder must enter the identification number in the presence of a store clerk, so that secrecy of the identification number cannot be guaranteed.

Several U.S. patents disclose the use of integrated cards that are used to access remote systems. U.S. Pat. No. 4,959,788 (Nagata et al.) discloses an IC card having a keypad, a display, and a memory unit. The keypad is used to enter transaction information which is then stored in the memory unit. When the card is inserted into an ATM, the card configures the ATM for the pre-entered transaction and thus saves the user time at the ATM.

U.S. Pat. No. 4,918,631 (Hara et al.) discloses a "smart" IC card that also has a calculator function. The card has a keypad which can be used to enter identification information. This identification information is compared to that stored in an internal memory and if there is a match, the card will be validated. Upon validation, a light emitting diode LED will be illuminated to indicate that the card is active. The merchant will then accept the card as a valid card. Because such a LED indicator is provided, an unauthorized user may enter identification information until the correct combination is determined and thus a lost or stolen credit card may be used until the loss of the card is reported to the credit card company.

U.S. Pat. No. 4,926,480 (Chaum) discloses a card that allows cryptographically secure transactions between a tamper resistant part of the card and an external system by the IC card. The card enables a user to enter information on a keypad located thereon. The card can be used to access several different types of computer systems. The tamper resistent part contains coded information which will allow a secure protocol to be established between the tamper resistant part and the external system. The user inputs access enabling information upon the keypad which is then checked against the coded information. If there is a correspondence between the two bits of information, the card is enabled. The card is then allowed to communicate with an external system via a secure protocol.

U.S. Pat. No. 4,928,001 (Masada) discloses an integrated circuit IC card that has multiple user sections. By entering the appropriate identification code, access to one or more of the user sections is allowed.

U.S. Pat. No. 4,960,982 (Takahira) discloses an IC card comprising a microprocessor which accepts access information and checks this information with a prestored key. If the information matches the key, then the card is enabled and allows access to a mass storage device.

SUMMARY OF THE INVENTION

In accordance with one aspect of the invention, a method is provided for establishing direct communication between a clearing house for a plurality of accounts with the same or different credit card companies and the holder of a programmable credit card including programmable electronics so as to provide verification of the credit card and to provide debiting of a selected one of the plurality of accounts. The method comprises the steps of: activating the credit card to provide power to the programmable electronics of the credit card; entering an identification number on a keyboard of the credit card; selecting one of said plurality of accounts to debit by entering a multi-digit number which completes an account number stored by said credit card to provide a completed account number; temporarily preserving said identification number and said completed account number in a form that is not discernible to the human eye, e.g., by emulating the same on a magnetic strip; using a reader device to read out the preserved identification number and completed account number; transferring said identification number and said completed account number read out by said reader device to a communications device; using said communications device to transmit said identification number and said completed account number to said clearing house; verifying said identification number at said clearing house; and transmitting from said clearing house a verification of debiting of the account corresponding to said completed account number and eliminating the temporarily stored data in response to an erase signal delivered in a time period approximately equal to time required for a transaction to be completed.

In a preferred embodiment, the identification number and completed account number are temporarily preserved by emulating said numbers on an inducer behind a magnetic strip provided on said card as noted above, and the numbers are subsequently read out from said magnetic strip by a reader device in the form of a conventional magnetic reader.

Advantageously, the method of the invention further comprises generating a tone after the entry of said identification number or another secret code on said keyboard and transmitting said tone by means of said communications device. Alternatively, or in addition, the method further comprises generating a preprogrammed identifying tone in response to making an entry on said keyboard in response to a random request for that entry from the clearing house.

In accordance with a further aspect of the invention, a programmable credit card is provided for enabling accessing of a selected one of a plurality of different credit accounts with the same or different credit card companies through communication with a clearing house for said credit accounts, wherein the credit card comprises: means for storing a basic account number; a keyboard for entering terminal digits which together with said basic account number define a completed account number and which identify a selected one of the plurality of accounts to be accessed, and for entering identification information for the card; processing means, receiving the terminal digits and the identification information from the keyboard, for outputting a drive signal representing said identification information said terminal digits and said basic account information and information retaining means responsive to the drive signal for temporarily preserving said identification information, and said terminal digits along with said basic account number to provide said completed account number, in a form which is readable by a reader device but is not discernible by the human eye so that upon reading of said completed account number and said identification information by the reader device during a credit transaction the completed account number and the information can be directly transmitted to said clearing house for verification and subsequent debiting of the account corresponding to the selected terminal digits.

The information retaining means can comprise a central processor and associated memory. In a preferred embodiment, the information retaining means comprises a programmable magnetic strip and a magnetic strip control circuit.

In an advantageous embodiment, the card further comprises a raised or embossed basic account number imprinted on a face of the card and corresponding to the stored basic account number, account number completing digits located on said card adjacent to, and at the end, of the raised account number so that said raised account number and said completing digits constitute a completed account number which is visible to a user, and account number varying means for varying the account number completing digits. In one embodiment, the account number varying means comprises at least one thumbwheel carrying raised digits corresponding to said terminal digits.

According to a further advantageous embodiment, the card further comprises speaker means for generating tones corresponding to said identification number.

In an alternative embodiment, the card further comprises speaker means for generating preprogrammed identification tones in response to depressing selected keys of the keyboard.

Other features and advantages of the invention will be set forth in, or apparent from, the following detailed description of preferred embodiments of the invention.

BRIEF DESCRIPTION OF THE DRAWINGS

FIG. 1 is a front elevational view of a credit card constructed in accordance with a preferred embodiment of the invention;

FIG. 2 is a rear elevational view of the credit card of FIG. 1;

FIG. 3 is a side elevational view of an alternative embodiment of the credit card of FIG. 1;

FIG. 4 is a block diagram of the circuits utilized in the credit card of FIG. 1;

DESCRIPTION OF THE PREFERRED EMBODIMENTS

Figure 5:
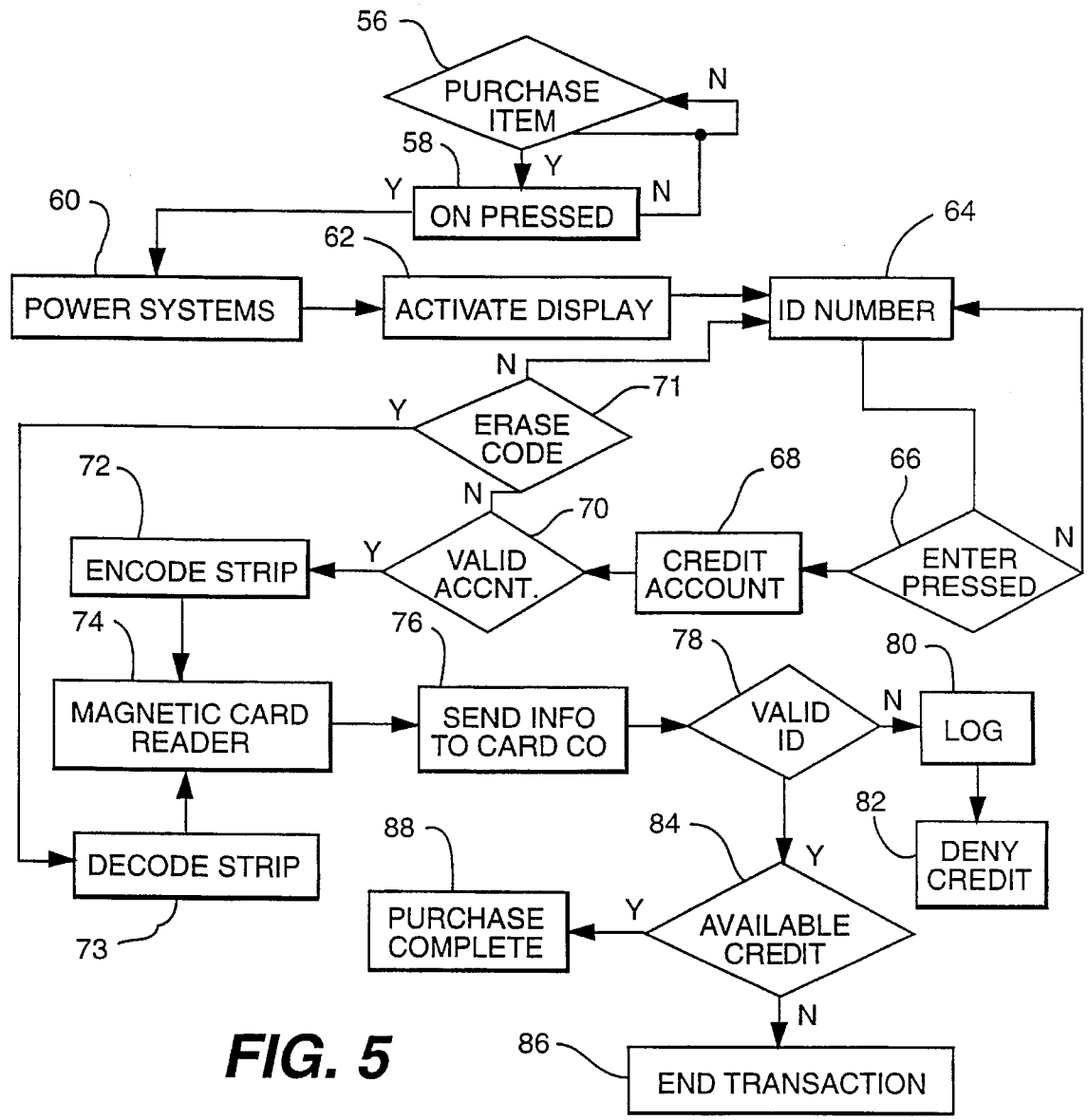
FIG. 5 is a flow chart which illustrates a typical transaction using the card of FIG. 1.

Referring to FIGS. 1, 2 and 3, a programmable credit card, generally denoted 10, is illustrated. The front face of card 10 is similar to that of many commercial credit cards in that the card 10 has embossed letters 12 which identify the authorized user of the card 10. Further, there are embossed account numbers 14 on card 10 which identify the particular credit account from which charges are deducted when a purchase or cash advance is made. In accordance with an important feature of the invention, the last two digits, denoted 16, of account number 14 can be changed to any value from 00 to 99. The ability to change the embossed numbers 14 on credit card 10 is vital in that this enables the use of a single card to access many different credit accounts and, in particular, in one preferred embodiment, access to accounts at many different credit card companies or to different banks within the credit system of a credit company. To this end, the last two digits 16 are used to indicate different credit companies or banks and a specific combination of numbers, e.g., 01, is used to indicate one credit card company or bank while another, e.g., 02, is used to indicate another credit card company or bank or a different account with the first credit card company.

A speaker 18 is also provided on the card 10. This speaker allows the card to broadcast a tone corresponding to the particular identification number over conventional telephone lines by using tones associated with the particular digits of the identification number after the identification number or another secret code has been entered. However, in accordance with a preferred embodiment described below, the ability to generate a particular tone in response to a random request is used as a check by the credit company that the person using the card is authorized to do so.

An input/output port 19 is also provided on the card so that conventional terminal equipment may be utilized to access account and identification information which is stored in the memory of the card.

The back of the card 10 has a magnetic strip 20 which allows a conventional magnetic reader to extract information from the strip 20. The magnetic strip 20 will be programmed with the account number 14 and an authorization code that is entered by the card user. The card 10 has a numerical pad 22 having numerical keys 24, a power on key 25, and an enter key 26. The pad 22 is used to enter the particular credit company, i.e. the last two digits of the account number 14, and the authorization code. A solar cell 28 is provided for recharging a battery 30. Battery 30 is a typical rechargeable battery and provides power to the systems of the card 10. A display 32 is provided for displaying the account number 14 which has just been entered. A wheel 34 is located on the back of card 10 and allows the last two digits 16 of account number 14 to be changed as desired. These digits 16 are visible through a window 16a on the front of the card 10. Alternatively, two thumbwheels, each containing the digits 0 to 9, can be used to generate the two digits 16.

In a preferred embodiment, the card 10 has substantially the same thickness of about 0.8 mm, i.e., the thickness of conventional credit cards, and meets other ISO standards associated with such credit cards. FIG. 3 illustrates an alternative embodiment where the card 10 has a varying thickness in order to accommodate the system electronics while still permitting the card to be read by conventional magnetic card readers. As illustrated in this embodiment, the card 10 has an 0.8 mm thick projecting portion 36 which carries magnetic strip 20 and a thicker body portion 38 which houses the system electronics. The projecting portion 36 allows magnetic strip 20 to be inserted into conventional magnetic readers. By having a thicker body portion 38, cheaper electronics can be used and the card 10 can be manufactured at a reduced cost. The major systems and circuits utilized in card 10 are illustrated in FIG. 4. As may be seen, the card is composed of a central processing unit (CPU) 40, a read only memory (ROM) 42, dynamic memory (RAM) 44, a power supply system 46, a display control circuit 48, a speaker control circuit 50, a keyboard circuit 52, an input/output port controller 53, a magnetic strip controller 54 and an inductor 55. The power supply system comprises the solar cell 28 and the rechargeable battery 30. The CPU 40 receives power from the power supply system 46 and distributes the power to the other systems and circuits. Additionally, the CPU 40 controls the above systems and circuits by a programmed sequence of steps which is stored in the ROM 42. For clarity, the operation of the above circuits will be explained in conjunction with the operation of the card as illustrated in the flow chart shown in FIG. 5 and described below.

Considering the overall operation of the credit card 10, a typical transaction is illustrated in FIG. 5. The first step is to determine whether to purchase an item or request a cash advance, as indicated in decision diamond 56. If no purchase is desired, the card is not activated. In the case where a purchase is desired, the card user will press the ON key 25, as is indicated by operation block 58. In response to pressing of the ON key 25 by the user, the CPU 40 will supply power to systems and circuits identified above, as indicated by operation block 60. Additionally, the numerical keys 24 and enter key 26 will be enabled by the keyboard controller circuit 52. The display control circuit 48 will display a message which states "please enter ID number" or provides an equivalent prompt to the user on display 32, as indicated by operation block 62. The card user will then enter his or her identification number as indicated by block 64. Next, the keyboard controller circuit 52 will scan the keyboard to see if the enter key 26 is pressed as indicated by decision diamond 66. When the enter key 26 is pressed, the identification number will be stored in RAM 44 by the CPU 40. If the card user wishes to erase any information stored on magnetic strip 20, a predetermined erase code, such as a series of zeroes, may be entered, as indicated at decision triangle 71, in order to decode strip 20 as indicated by decode block 73, discussed further below.

The display control circuit 48 will then display a message which states "please select a credit account" or provides an equivalent prompt to the user on display 32, as indicated by block 68. The keyboard controller circuit 52 will then receive the next two digits entered and send this information to the CPU 40. The CPU 40, in turn, will use the two digit code to identify a credit account stored in ROM 42. If there is no account number which corresponds to the entered two digit code, the CPU 40 will request the display control circuit 48 to re-display the prompt indicated by block 62. If the account is valid, as indicated by decision diamond 70, the CPU 40 will store the account number 14 in the RAM 44. It should be understood that a single variable digit (ranging from 0 to 9) can be used to provide ten choices although the use of multiple digits is preferred because the much greater number of choices provided helps combat fraud. In an advantageous embodiment, the card can be preprogrammed when issued to display on display 32 the credit card company (using an abbreviation or acronym) corresponding to the digit or digits selected.

Figure 6:
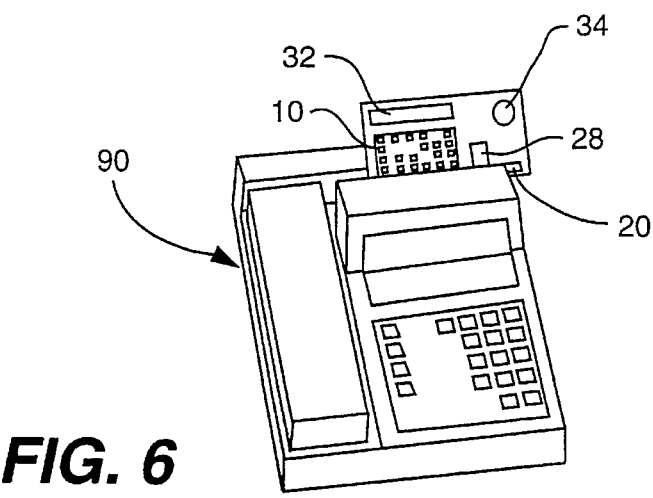
FIG. 6 illustrates the location of the magnetic card interface during the reading transaction.

The next step is to encode the magnetic strip 20 with the account number 14 and identification information, as indicated by block 72. The magnetic strip 20 is encoded by the magnetic strip control circuit which emulates the account number 14 and the identification number on strip 20 so that a clerk may place the card 10 in a conventional magnetic card reader as indicated by block 74. This encoding may be achieve as disclosed in U.S. Pat. No. 4,868,376 to Lessin et al., herein incorporated by reference. The teachings relied on are in column 19, line 48-column 20, line 17 in Lessin et al. As shown in FIG. 4 of the present application, data to be communicated is output from a processor and is converted by a magnetic strip control circuit 54. Magnetic strip control circuit 54 outputs a signal to drive an inductor 55 that generates a magnetic field pattern which can be read by a conventional card reading device 90, as shown in FIG. 6 of the present application. Signals representing the data to be communicated are output serially, thus emulating data encoded on a magnetic strip.

In order to ensure that the data is only temporarily preserved in accordance with one of the security features of the present invention, after a certain predetermined period of time sufficient for completion of the transaction, for example, five minutes, the processor 40 will supply a signal to the magnetic strip control circuit 54 which eliminates the generation of the magnetic field, thereby decoding or erasing the magnetic strip as indicated at step 73. The elimination may also be manually affected by entering an erase code in the keyboard as discussed above.

In this embodiment, the card reader will dial the financial institution associated with the account number 14 and will send the account number 14 as well as the identification to the financial institution as indicated by block 76. The financial institution can be a credit card company which acts as a clearing house for its accounts at, e.g., a number of different banks or can be a credit clearing house set for the purposes of servicing the accounts of different credit card companies, i.e., to act as a clearing house for a number of different credit cards. Upon receiving the account number 14 the credit company will verify the identification information against their files and either accept the card as valid or invalid, as indicated by decision diamond 78. If the identification is invalid, the credit will be declined and the use of the invalid identification attempt will be logged as indicated by block 80 and the credit will be denied, thus ending the transaction, as indicated in block 82.

The ability to transmit the identification information to the credit company for verification removes the possibility of collusion between the store clerk and a potential thief of a credit card. It will also cut down on credit card fraud by allowing only valid uses to access the account. Additionally, by having the credit company verify the identification information, neither the credit card user or the clerk will know if the identification information that was entered is incorrect or if the available credit will or will not cover the purchase. Thus, the only entity to know whether an incorrect identification is used is the credit card company.

Continuing with a consideration of the normal manner of use of the credit card 10, if the identification is valid, as indicated by the "Y" branch of decision diamond 78, then a decision is made as to available credit, as indicated by decision diamond 84. If there is not enough available credit, the credit company will send a message to the conventional magnetic reader to indicate that the transaction has been terminated due to lack of credit, as indicated by block 86. If there is available credit, indicated by the "Y" branch of decision diamond 84, then the transaction will be billed and the credit card user has purchased the goods, as indicated by block 88.

Card 10 also allows transactions to be conducted by imprinting a copy of the account number 14 on a signed bill. In this situation, the credit card user will turn wheel 34 so that the last two digits 16 represent the account that is to be debited. Then the clerk will imprint a copy of the account number 14 in a conventional fashion.

In an alternative embodiment, a conventional optical scanner (not shown) can be used to read the account number 14 and identification information into the scanner. In this embodiment, the scanner may read information from the embossed numbers 14 or the display 32. When the information is input into the scanner, the transaction will be conducted as described above.

As stated above, card 10 is provided with a input/output port 19. This port 19 can, in an alternative embodiment, be utilized to allow a conventional terminal to read the account number 14 including the last two digits 16 and identification information directly from the ROM 42 and RAM 44 of the card 10 and this information can be transmitted to a credit company or to a clearing house for a number of credit card companies. Thus, conventional terminals can also be utilized in connection with card 10 to read out the information which is read out by a magnetic reader in the embodiment described above. After the account number 14 and the identification information is read into the terminal, the transaction will proceed as described above from block 76.

The card 10 also allows for secure telephone transactions which utilize the card 10. In a typical prior art telephone transaction, the sales representative requests the cardholder to read the account number off of the credit card and there is no way to identify whether the cardholder is the authorized user of a credit card. By utilizing the speaker 18 on the card 10 and an associated tone generator, the card can be used to generate tones associated with the keys 22. In operation, the sales representative will take the order of the card holder and request by telephone that the credit card company interface with the cardholder to provide verification that the cardholder is indeed authorized to use the card. To provide this verification, the credit card company first requests that the cardholder press the keys associated with the card identification number. Upon pressing of the keys 22 by the cardholder, distinct tones are generated by the speaker. The credit card company will receive the tones and be able to determine if the tones, which correspond to the identification number, match with the tones that are stored at the credit card company (or clearing house) for that particular account. By providing the credit card company with the ability to verify the identification information, the likelihood of a lost or stolen card 10 being successfully used is significantly reduced since the authorized cardholder and the credit card company are the only two people who know the correct identification number. Of course, when an unauthorized user of the card enters an incorrect identification number, the tones that will be generated will be incorrect or invalid and the credit card company will have been given notice of an unauthorized attempt to access credit on the particular account and can take remedial action to protect the account. In an alternative embodiment, the credit card company or clearing house can request of a cardholder who telephones the company to press certain keys selected at random and thus automatically generate corresponding preprogrammed tones over the telephone. This prevents an authorized person who has secretly recorded the card identification tones but does not have the card itself from effectively using the card.

Although the present invention has been described to specific exemplary embodiments thereof, it will be understood by those skilled in the art that variations and modifications can be effected in these exemplary embodiments without departing from the scope and spirit of the invention.

What is claimed is:

1. A programmable credit card for enabling accessing of a selected one of a plurality of different credit accounts with the same or different credit card companies through communication with a clearing house for said credit accounts, said credit card comprising:

means for storing a basic account number;

a keyboard for entering terminal digits which together with said basic account number define a completed account number and which identify a selected one of the plurality of accounts to be accessed, and for entering identification information for the card;

processing means, receiving said terminal digits and said identification information from said keyboard, and said basic account number from said storing means, for outputting a drive signal representing said identification information, said terminal digits and said basic account information; and information retaining means, responsive to said drive signal, for temporarily preserving said identification information, and said terminal digits along with said basic account number to provide said completed account number, in a form which is readable by a reader device but is not discernible by the human eye so that upon reading of said completed account number and said identification information by the reader device during a credit transaction the completed account number and the information can be directly transmitted to said clearing house for verification and subsequent debiting of the account corresponding to the selected terminal digits, said processing means further supplying a signal, in a time period approximating time required to complete a transaction, to said information retaining means which eliminates said identification information, said terminal digits and said basic account number.

2. The card recited in claim 1 wherein said processing means comprises a central processor, an associated memory and a magnetic strip control circuit.

3. The card recited in claim 1 wherein said information retaining means comprises an inductor.

4. The card recited in claim 1 further comprising a raised basic account number imprinted on a face of said card and corresponding to said stored basic account number, account number completing digits located on said card adjacent to, and at the end of, said raised account number so that said raised account number and said completing digits constitute a completed visible account number, and account number varying means for varying said account number completing digits.

5. The card recited in claim 4 wherein said account number varying means comprises at least one thumbwheel carrying raised digits corresponding to said terminal digits.

6. The card recited in claim 1 further comprising speaker means for generating tones corresponding to said identification number.

7. The card recited in claim 1 further comprising speaker means for generating preprogrammed identification tones in response to depressing selected keys of said keyboard.

8. A method for establishing direct communication between a clearing house for a plurality of accounts with the same or different credit card companies and the holder of a programmable credit card including programmable electronics so as to provide verification of the credit card and to provide debiting of a selected one of said plurality of accounts, said method comprising the steps of:

activating the credit card to provide power to the programmable electronics of the credit card;

entering an identification number on a keyboard of the credit card;

selecting one of said plurality of accounts to debit by entering a multi-digit number via said keyboard which completes an account number stored by said credit card to provide a completed account number;

temporarily preserving said identification number and said completed account number in a form that is not discernable to the human eye;

using a reader device to read out, from said form that is not discernable to the human eye, the preserved identification number and completed account number;

transferring said identification number and said completed account number read out by said reader device to a communications device;

using said communications device to transmit said identification number and said completed account number to said clearing house;

verifying said identification number at said clearing house;

transmitting from said clearing house a verification of debiting of the account corresponding to said completed account number; and eliminating said identification number and said completed account number from said form in response to an erase signal delivered in a time period approximating time required for a transaction to be completed.

9. A method as claimed in claim 8 wherein said identification number and said completed account number are temporarily preserved by emulating said numbers using an inductor behind a magnetic strip on said card and wherein said numbers are read out from said magnetic strip by a magnetic reader device.

10. The method as claimed in claim 8 further comprising the step of generating a tone after the entry of said identification number on said keyboard and transmitting said tone by means of said communications device.

11. A method as claimed in claim 8 further comprising the step of generating a preprogrammed identifying tone in response to making an entry on said keyboard in response to a random request for that entry from the clearing house.

12. The method recited in claim 8, wherein said eliminating step comprises entering an erase code on said keyboard and generating said erase signal in response to said erase code.

13. The method as recited in claim 8, wherein said eliminating step comprises generating said erase signal in response to passage of said time period.

* * * * *